United States Patent
Christensen et al.

(10) Patent No.: US 11,280,303 B2
(45) Date of Patent: Mar. 22, 2022

(54) SOUND ENHANCING SYSTEM

(71) Applicant: Ford Global Technologies, LLC, Dearborn, MI (US)

(72) Inventors: M. Scott Christensen, Canton, MI (US); Nicholas Herhusky, Dearborn, MI (US); Michael Bastanipour, Ferndale, MI (US); Hani Ayesh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 16/816,566

(22) Filed: Mar. 12, 2020

(65) Prior Publication Data
US 2020/0291908 A1    Sep. 17, 2020

Related U.S. Application Data

(60) Provisional application No. 62/819,397, filed on Mar. 15, 2019.

(51) Int. Cl.
*F02M 35/12*   (2006.01)
*G06F 3/16*    (2006.01)
(Continued)

(52) U.S. Cl.
CPC ......... *F02M 35/1294* (2013.01); *F02B 37/16* (2013.01); *F02B 37/24* (2013.01); *F02D 9/08* (2013.01); *F02D 41/0002* (2013.01); *F02D 41/0077* (2013.01); *F02M 35/10157* (2013.01); *G06F 3/165* (2013.01); *G10K 11/162* (2013.01);
(Continued)

(58) Field of Classification Search
CPC ......... F02M 35/1294; F02M 35/10157; F02M 35/16; F02M 35/10006; F02M 35/10222; F02M 35/10255; G06F 3/165; G10K 11/162; G10K 11/22; G10K 13/00; F02D 41/0077; F02D 41/0002; F02D 41/0047; F02D 41/021; F02D 41/0007; F02D 9/08; F02D 2200/606; F02D 2200/04; F02D 29/02; F02D 2041/0022; F02B 37/16; F02B 37/24; Y02T 10/12
See application file for complete search history.

(56) References Cited

U.S. PATENT DOCUMENTS 7,380,447 B2    6/2008  Rollinger et al.
8,384,528 B2 *  2/2013  McCarthy .............. G10K 15/02
                                                340/384.3
(Continued)

FOREIGN PATENT DOCUMENTS

CN   101397953 A   4/2009
EP     3156300 A1  4/2017

*Primary Examiner* — Audrey B. Walter
*Assistant Examiner* — Dapinder Singh
(74) *Attorney, Agent, or Firm* — Geoffrey Brumbaugh; McCoy Russell LLP

(57) ABSTRACT

Methods and systems are provided for enhancing and delivering engine sounds to a vehicle cabin based on a selected mode. In one example, a method may include adjusting openings of one or more valves fluidically coupling one or more corresponding engine regions to a sound tube of a sound enhancing system based on the selected mode. Throttle opening may also be adjusted to compensate for air routed from the engine regions to the sound tube instead of flowing to the engine cylinders.

17 Claims, 4 Drawing Sheets

(51) Int. Cl.

| | |
|---|---|
| *G10K 11/16* | (2006.01) |
| *G10K 13/00* | (2006.01) |
| *F02D 41/00* | (2006.01) |
| *F02B 37/16* | (2006.01) |
| *G10K 11/162* | (2006.01) |
| *F02B 37/24* | (2006.01) |
| *F02M 35/10* | (2006.01) |
| *F02D 9/08* | (2006.01) |

(52) U.S. Cl.
 CPC .......... *G10K 13/00* (2013.01); *F02D 2200/04* (2013.01); *F02D 2200/606* (2013.01)

(56) References Cited

U.S. PATENT DOCUMENTS

| | | |
|---|---|---|
| 8,567,192 B2 | 10/2013 | Chi et al. |
| 9,429,117 B2 * | 8/2016 | Takahashi .............. G10K 11/22 |
| 9,574,472 B1 * | 2/2017 | Dufford .................... F01N 9/00 |
| 10,001,089 B2 | 6/2018 | Xiao et al. |
| 2016/0265479 A1 * | 9/2016 | Nakashima ........ F02M 35/1294 |
| 2017/0096101 A1 * | 4/2017 | Bailey, III ............. G10K 15/02 |
| 2017/0107921 A1 | 4/2017 | Seldon et al. |
| 2018/0328321 A1 * | 11/2018 | Toda ....................... G06F 3/165 |

\* cited by examiner

SOUND ENHANCING SYSTEM

CROSS REFERENCE TO RELATED APPLICATIONS

The present application claims priority to U.S. Provisional Patent Application No. 62/819,397, entitled "Sound Enhancing System", filed on Mar. 15, 2019. The entire contents of the above-listed application are incorporated herein by reference for all purposes.

FIELD

The present description relates generally to methods and systems for enhancing engine sounds delivered to a vehicle cabin.

BACKGROUND/SUMMARY

Enhancements towards driver and passenger comfort within the automotive industry have resulted in production of vehicle cabins effectively insulated from obtrusive sounds generated by the engine. In particular, noises produced by increased flow of air into the engine intake and/or turbocharger operations may be disruptive to passengers holding conversations within the vehicle cabins. However, emission of engine sounds into the vehicle cabin may be desirable during some conditions and a driver's perception of vehicle response and power output may be largely based on audial information received from adjustments in audible engine frequencies. For example, in a race car, aftermarket blow-off valves relieving intake pressure may emit a sound that is distinctive from when no pressure relief device is installed and a compressor is allowed to surge. As a result of current emissions regulations, however, pressure-relief devices are no longer able to vent directly to the atmosphere, thus the associated sound is no longer produced. Furthermore, compressor surge may lead to degradation of compressor components, thus modifications to the compressor, e.g., recirculation passages, variable inlet devices, etc., may be utilized to inhibit compressor operation in surge, thereby precluding generation of compressor surge sound.

Attempts to address the lack of distinctive performance vehicle sounds include adapting a vehicle with a sound enhancement system in communication with at least one of an intake manifold and an exhaust manifold of an engine, as shown by Seldon et al. in U.S. 2017/0107921. The device includes an interface between a conduit inlet of the device and at least one of the intake manifold and the exhaust manifold that is responsive to pulses from at least one of the coupled manifolds. The pulses are amplified and delivered to an exterior of the vehicle. Thus, engine sounds may be enhanced and audible to observers inside and outside of the vehicle.

However, the inventors herein have recognized that a demand for amplified engine sounds may vary depending on driver preference, driving conditions, time of day, etc. For example, a level of sound associated with a race car may not be desirable during early morning or late night hours. Furthermore, coupling the sound enhancement system to the intake and/or exhaust manifold may not transmit sounds produced by a turbocharger, detracting from an authenticity of a performance vehicle experience.

In one example, the issues described above may be addressed by an engine method, comprising: adjusting one or more valves fluidically coupling a region of an engine to a sound tube of a sound enhancing system to route engine sound to a vehicle cabin based on a mode selected by an operator, and selectively adjusting a throttle opening to compensate for air routed from the region to the sound tube. A complete range of engine sounds may therefore be modified and provided to the vehicle cabin based on operator preference.

As one example, a sound enhancing device may provide a pathway for sound waves to flow from at least one of an intake passage, a charge air passage, a compressor recirculation path, and an exhaust passage to a vehicle cabin. Emanating sounds may be adjusted based on both physical modification of device components and user selectable controls. In this way, sounds generated at the engine intake manifold, exhaust manifold, and turbocharger may be enhanced and transmitted to the vehicle cabin and adjustable to a cabin occupant's preferences.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
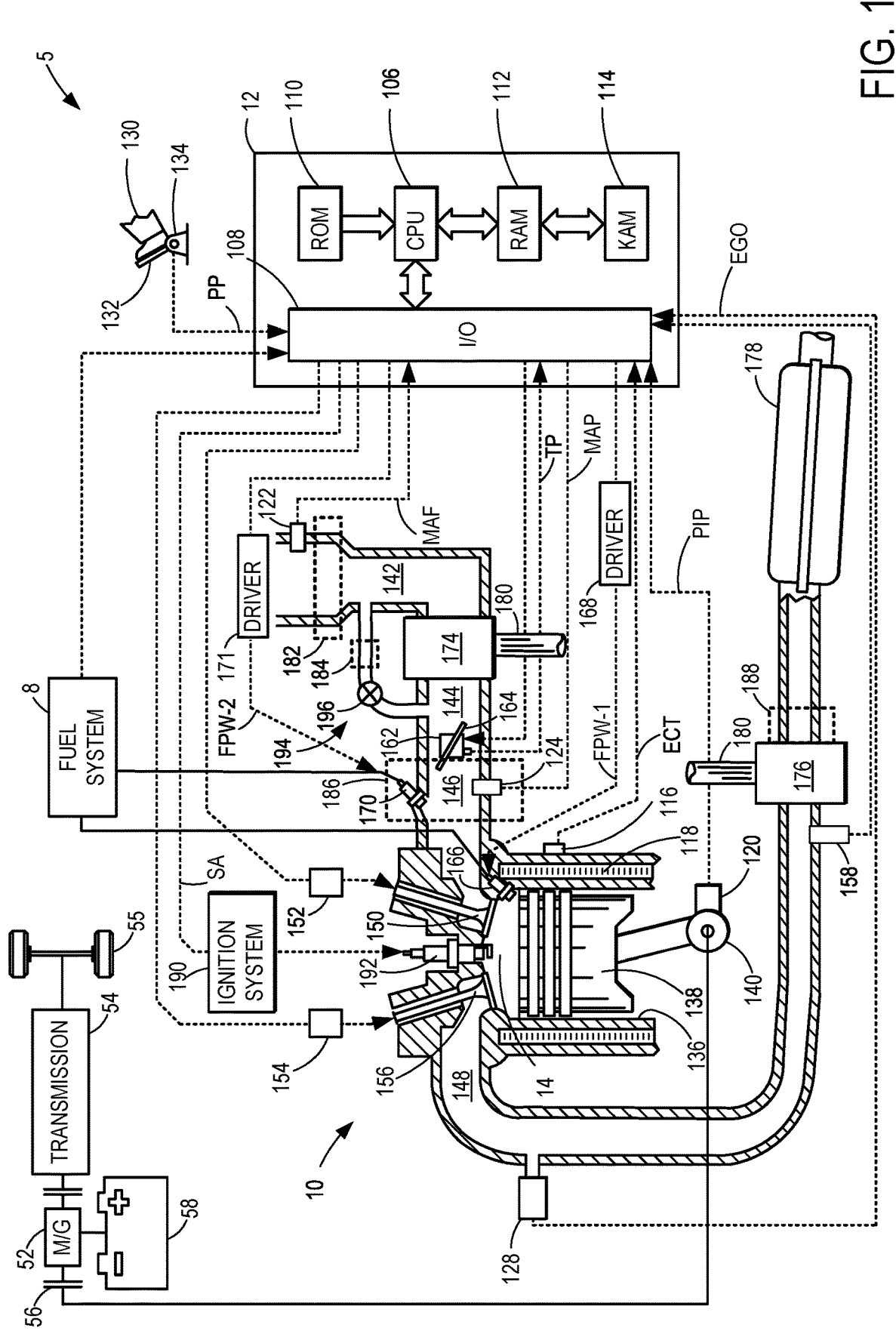
FIG. 1 shows a schematic diagram of an example engine system in which a sound enhancing device may be implemented.
Figure 2:
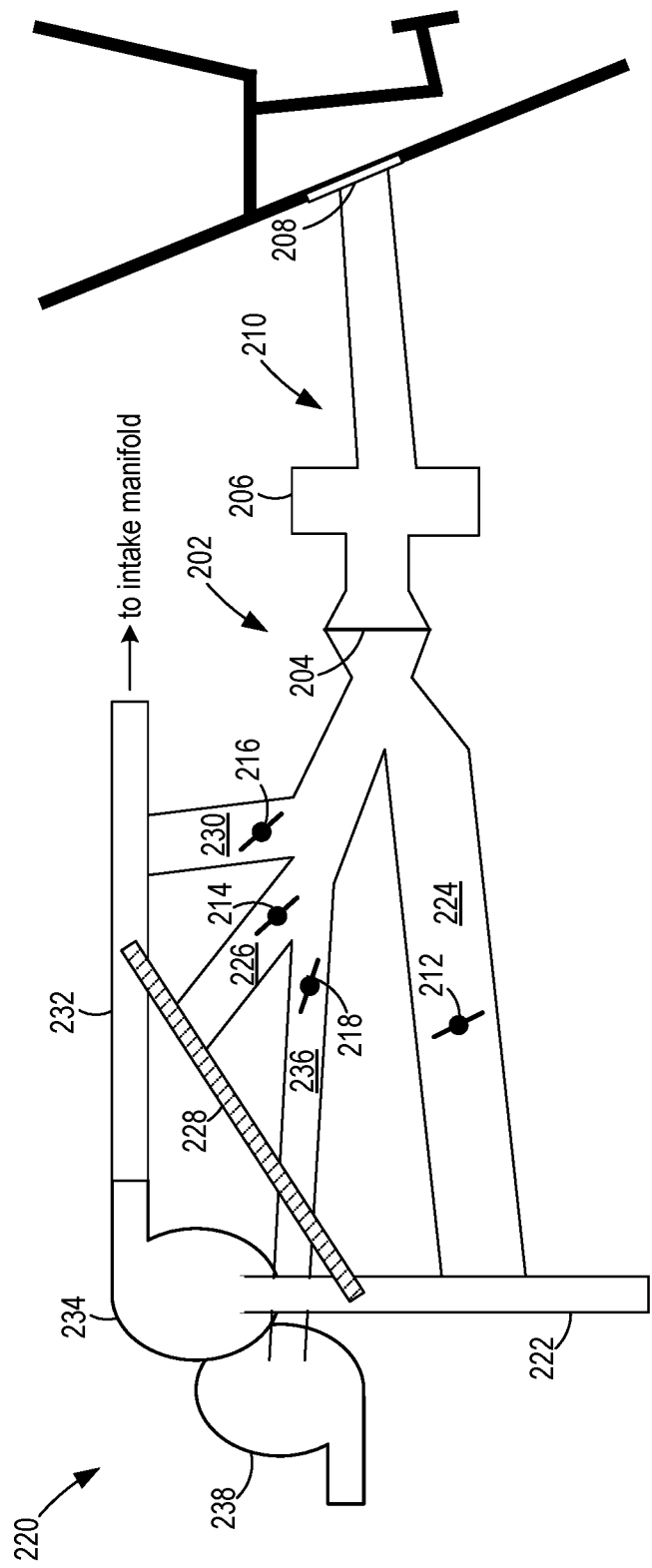
FIG. 2 shows a schematic diagram of an example of a sound enhancing device including various regions of an engine system that may be aurally linked to a vehicle cabin through the device.
Figure 3:
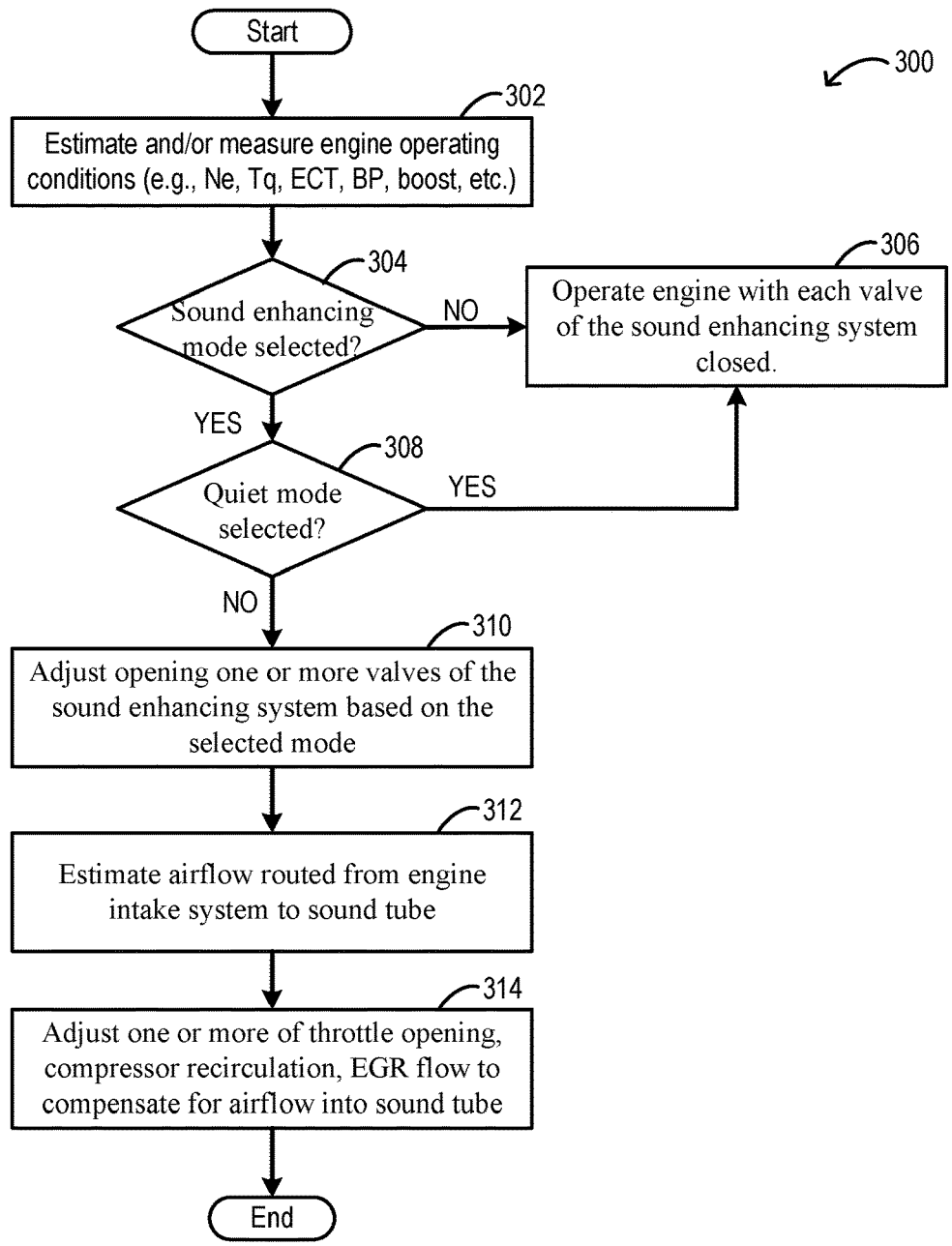
FIG. 3 shows a flowchart of an example method for operating the sound enhancement system.
Figure 4:
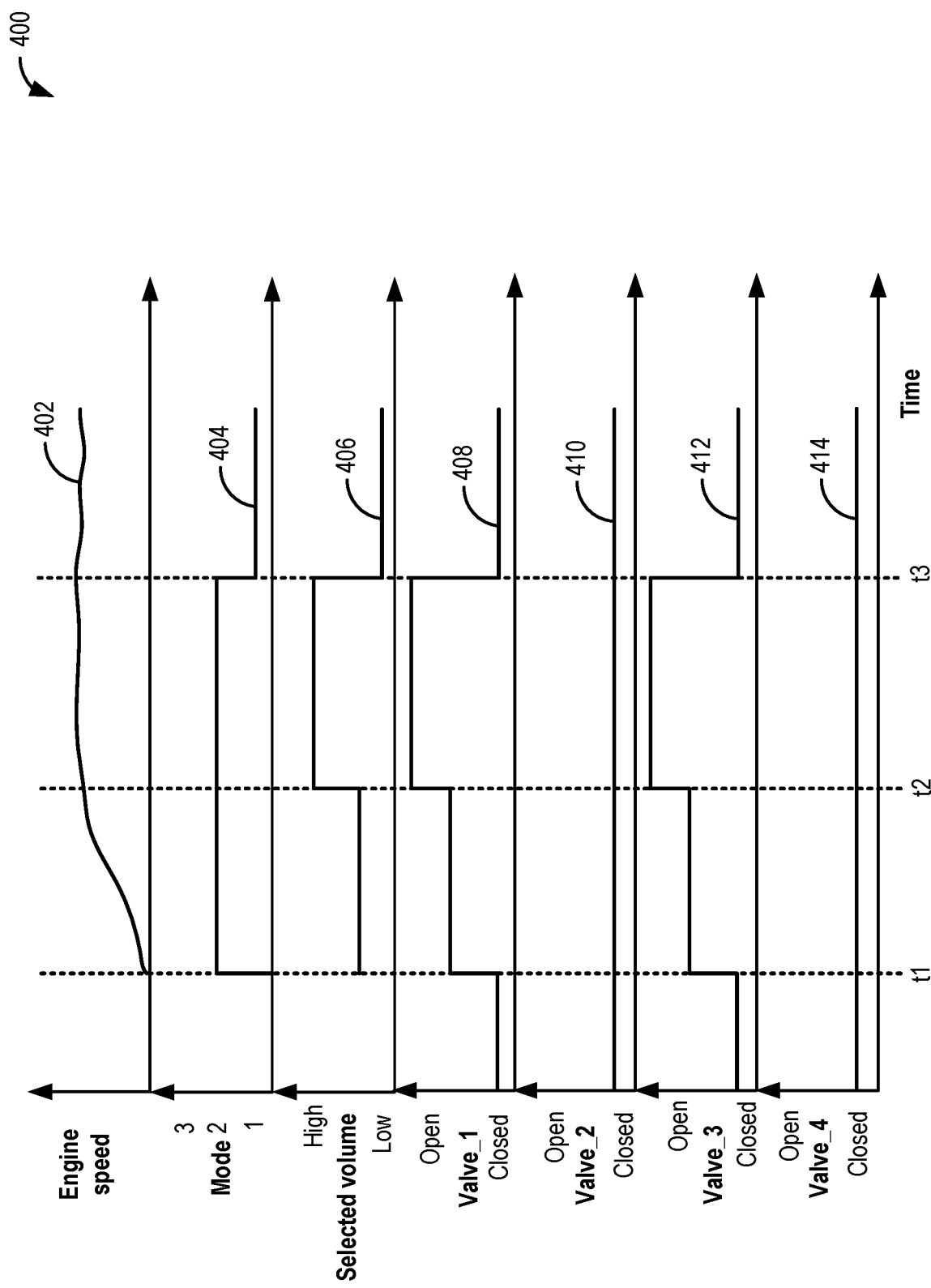
FIG. 4 shows an example operation of the sound enhancement system.

The following description relates to systems and methods for a sound enhancing device for a vehicle. The sound enhancing device may include a pathway for channeling engine sounds to a vehicle interior. An example of a turbocharged engine system that may be adapted with the sound enhancing device is shown in FIG. 1. The sound enhancing device may include several components such as an adjustable valve, a diaphragm, a tuning cavity, etc. that provide modification and optimization of frequencies delivered to the vehicle interior. The components of the sound enhancing device are shown in FIG. 2, indicating optional positioning of the adjustable valves to amplify sounds from targeted regions of the engine system. A degree of sound enhancement, as well as type of sound, may be requested by an operator and executed by an electronic control unit (ECU) of the engine system based on pre-set modes stored on the ECU system memory. An example of a routine for operating the sound enhancing system is depicted in FIG. 3. Tunable, variable sound enhancement is thereby provided, providing vehicle occupants with a satisfying performance vehicle experience. FIG. 4 shows an example operation of the sound enhancing system.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

Intake air passage 142 may include a recirculation passage 194 that allows air to flow around compressor 174, from downstream of compressor 174 to upstream of compressor 174 in a direction opposite of flow through intake air passage 142. As such, when a recirculation valve 196 in the recirculation passage 194 is adjusted open, at least a portion of air compressed by compressor 174 may be returned to an inlet of compressor 174, merging with intake air flowing through intake air passage 142. In one example, the recirculation valve 196 may be a variable flow valve, configured to return excess air flow to an inlet of the compressor 174, decreasing a likelihood of compressor surge and allowing compressor 174 to operate at mass air flow rates in excess of those demanded by the engine. Recirculation valve 196 may be adjusted between a fully open position and a fully closed position, or configured to be continuously adjustable to any position between the fully open and fully closed positions.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving a signal from the input device 132 that an accelerator pedal tip-in is occurring, the engine controller may command adjustments to increase boost pressure (e.g., pressure of compressed air delivered from the compressor outlet to the combustion chambers). A valve of an exhaust wastegate (not shown in FIG. 1), coupling the exhaust passage 148 upstream of the turbine 176 to a region of the exhaust passage 148 downstream of the turbine 176 and upstream of the emission control device 178, may be closed. Exhaust gas may be channeled exclusively to the turbine 176 to increase a rotational speed of the turbine 176, thereby increasing compressor speed and boost pressure. Alternatively, a supercharger, if present, may be used to spin-up the compressor rapidly to achieve a desired boost pressure.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a performance vehicle, such as a race car. Engine operations in a performance vehicle may be expected to produce distinctive sounds. For example, during a tip-in event indicating a request for increased torque, vehicle occupants may expect frequencies resulting from augmented compressor speed and/or release of exhaust gases through the exhaust passage 148 to be audible. Channeling the sounds to a vehicle cabin may be desirable in order to provide occupants with an anticipated performance vehicle driving experience. Delivery of the sounds may be achieved by configuring the vehicle with a sound tube, described further below with reference to FIG. 2.

The sound tube may be coupled to various regions of the engine system to enhance a sound generated at a specific engine component. For example, as shown in FIG. 1 by dashed boxes, the sound tube may be coupled to a first region 182, proximate to an inlet of intake air passage 142, a second region 184, along the recirculation passage 194, a third region 186, along intake air passage 146 downstream of compressor 174, and a fourth region 188, downstream of turbine 176 and upstream of emission control device 178, at an outlet of turbine 176. It will be appreciated that a positioning of each of the regions shown in FIG. 1 are non-limiting examples and variations in placement of the regions are possible without departing from the scope of the present disclosure. For example, the second region 184 may be positioned upstream or downstream of the recirculation valve 196 or the third region 186 may be disposed along intake air passage 146 upstream or downstream of throttle 162. Furthermore, an engine may include any combination and any number of the regions shown in FIG. 1. As an example, the engine may have a sound tube coupled to both the first region 182 and the fourth region 188, or only the third region 186, or to all four regions, etc.

A sound tube may be a device that channels audible frequencies from a source to a destination, enhancing an amplitude of the sound waves as the waves pass through components of the sound tube. An example of a sound tube 202 is shown in a schematic diagram 200 in FIG. 2. The sound tube 202 may have components including one or more adjustable valves, a flexible membrane or diaphragm 204, a tuning cavity 206, and a foam interface 208, arranged along a conduit 210 of the sound tube 202. As the sound wave travels through the different components of the sound tube 202, the sound characteristics are altered and tuned to the preference of the cabin occupant and undesirable bandwidths are rejected. A speaker, coupled to the sound tube 202, may be positioned in the vehicle cabin via which the sound may be transmitted to the cabin. In one example, the speaker may be in contact with the foam interface 208 (not shown in FIG. 2).

The flexible membrane 204 may be free to deflect in response to acoustic pressure pulsations transmitted along the sound tube 202. The flexible membrane 204 may be made of rubber film, fabric film, plastic film, metal foil, or thin sheet metal, for example. A tension in the membrane 204 and a thickness of the membrane 204 may be selected to tune the acoustic flexure properties of the membrane 204, thereby adjusting the sound amplitude vs. frequency spectrum reaching the tuning cavity 206. The tuning cavity 206 may act as a resonator, thereby enhancing certain frequencies. A shape and size of the tuning cavity 206 may be selected to attain a desired resonance frequency.

The foam interface 208 may further modify the frequency spectral response of the sound tube 202 and provide a desired amount of sound dampening. The frequency spectral response and sound dampening level may be calibrated by varying a composition of the foam, varying a cell size, a cell wall thickness, a density distribution (determined by the size and location and wall thickness of cells in the foam), a cell open ratio of the foam (fractional number of cells having open walls), a stiffness of the foam, a material density of the foam material, a thickness of the layer(s) of the foam, as well as by adding additional foam layers having differing properties.

In one example, the sound tube 202 may be included in the vehicle 5 of FIG. 1, coupled to one or more of the first through fourth regions, 182, 184, 186, and 188. The one or more adjustable valves may include a first valve 212, which may couple to the first region 182 of FIG. 1, a second valve 214, which may couple to the second region 184 of FIG. 1, a third valve 216, which may couple to the third region 186 of FIG. 1, and a fourth valve 218, which may couple to the fourth region 188 of FIG. 1.

The adjustable valves shown in FIG. 2 may be disposed in branches merging into the conduit 210 of the sound tube 202 and configured to extend from the conduit 210 to targeted regions of an engine system 220 similar to the first through fourth regions 182, 184, 186, and 188 of FIG. 1. For example, the first valve 212 is positioned in a first branch 224 of the conduit 210, extending between the conduit 210 and a low pressure (e.g., ambient pressure) intake passage 222. The second valve 214 is arranged in a second branch 226 of the conduit 210, extending between the conduit 210 and a compressor recirculation passage 228. The third valve 216 is disposed in a third branch 230, extending between the conduit 210 and a charge air passage 232 that couples a compressor 234 to an intake manifold downstream of the compressor 234. The fourth valve 218 is positioned in a fourth branch 236, extending between the conduit 210 and an outlet of a turbine 238.

The adjustable valves may be continuously adjusted between a fully open position and a fully closed position to modulate passage of sound waves through the valves generated at the associated engine region. By partially or completely opening the first valve 212, sound from the intake passage 222 may be routed to the passenger cabin. By partially or completely opening the second valve 214, sound from the compressor recirculation path 228 may be routed to the passenger cabin. By partially or completely opening the third valve 216, sound from the charge air passage 232 may be routed to the passenger cabin. By partially or completely opening the fourth valve 218, sound from the exhaust passage, e.g., at or downstream of the outlet of the turbine 238, may be routed to the passenger cabin. In one example, only one valve may be opened at a time. In another example, one or more valves may be simultaneously opened at a time.

The vehicle operator may select a mode of operation of the sound enhancing system based on his preference. The operator may select the mode as an input through a human machine interface (HMI) located at a dashboard of the vehicle. The operator may also select the mode via a computing device used by the operator such as a smartphone, laptop, tablet, etc. In one example, the modes may correspond to a race car mode, a performance car mode, a quiet driving mode, etc. As an example, the sound reaching the vehicle cabin during operation at each mode may come from one or more engine regions. The race car mode may be louder than the performance car mode, and in the race car mode, sound from the compressor recirculation path and the exhaust passage may be conveyed to the vehicle compartment. The performance mode may be louder than the quiet driving mode, and in the performance car mode, sound from the intake passage and the charge air passage may be routed to the passenger cabin. While in the quiet driving mode, all the adjustable valves of the sound enhancing system may be closed and engine sound may not be routed to the vehicle cabin. In addition to the three modes mentioned, there may be a plurality of modes with varying amplitude of sound and quality of sound (based on sound origin) that are routed to the vehicle cabin.

When one or more adjustable valves such as one or more of the first valve 212, second valve 214, and the third valve 216 are open, air from the intake passage 222, the compressor recirculation path 228, and the charge air passage 232, respectively, is routed to the sound tube 202. Due to routing of intake air to the sound tube 202, a method for air flow compensation is demanded such that a desired charge airflow may be maintained at the engine cylinders. Compensating for the diverted air includes adjusting one or more of an opening of an intake throttle, an opening of an exhaust gas recirculation (EGR) valve, an opening of a compressor recirculation valve, and a geometry of a variable geometry exhaust turbine, the adjusting based on an estimated amount of air diverted to the sound tube. In this way, sound from specific parts of the engine may be transmitted to the vehicle cabin without any substantial change in charge air volume and boost provided to the engine is not adversely affected.

In this way, the systems discussed above at FIGS. 1 and 2 may enable an engine system comprising: a controller with computer readable instructions stored on non-transitory memory that, when executed, cause the controller to: in response to selection of a mode of operation of a sound enhancing system by an operator, open one or more valves fluidically coupling one or more corresponding engine regions to the sound enhancing system to route air from the one or more corresponding engine regions to a vehicle cabin via a sound tube of the sound enhancing system, estimate an amount of air routed to the vehicle cabin, and adjust charge airflow based on the estimated amount of air routed to the vehicle cabin.

FIG. 3 shows an example method 300 that may be implemented to operate a sound enhancing system in a vehicle and route a desired engine sound to a vehicle chamber. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating parameters may be determined. The parameters may include vehicle speed, torque demand, engine speed, engine temperature, boost pressure, charge air pressure, etc. In addition, ambient conditions including ambient temperature, barometric pressure, etc. may also be estimated.

At 304, the routine includes determining if a sound enhancing mode has been selected. In one example, the sound enhancing modes may include a quiet mode (mode 1), a performance car mode (mode 2), a race car mode (mode 3), etc. The operator may select the mode as an input through a human machine interface (HMI) such as a touchscreen located at the dashboard of the vehicle. The operator may also select the mode via a computing device used by the operator such as a smartphone application, laptop, tablet, etc., where the computing device is communicatively linked to the controller.

For example, each mode may correspond to sound from one or more distinct regions of the engine as routed to the vehicle cabin via a sound tube (such as sound tube 202 in FIG. 2). The sound enhancing system may include at least four adjustable valves coupled to distinct engine regions and by at least partially opening a valve, sound from an engine region corresponding to the valve may be routed to the vehicle cabin via a flexible membrane, a tuning cavity, and a foam interface arranged along a conduit of the sound tube. As the sound waves from one or more engine regions travel through the components of the sound tube, an amplitude of the sound waves may be magnified and undesirable frequencies may be removed, thereby enhancing the sound. In one example, a first valve (such as first valve 212 in FIG. 2) may fluidically couple the lower pressure intake passage to the sound tube, a second valve (such as second valve 214 in FIG. 2) may fluidically couple the compressor recirculation passage to the sound tube, a third valve (such as third valve 216 in FIG. 2) may fluidically couple the higher pressure intake passage (charge air passage) to the sound tube, and a fourth valve (such as fourth valve 218 in FIG. 2) may fluidically couple the turbine outlet of the exhaust passage to the sound tube.

Each mode may correspond to a combination of valve openings. One or more of the valves may be opened in response to the selected mode. For example, a look-up table providing relationships between the mode and opening of a valve or of a specific combination of valves to provide the specific mode may be stored in the controller's memory and referred to upon detection of a request for a particular mode.

If it is determined that the operator has not selected any sound enhancing mode, at 306, the engine may be operated with each of the first valve, the second valve, the third valve, and the fourth valve of the sound enhancing system closed. In this way, undesired engine sound may not be routed to the vehicle cabin. If it is determined that a sound enhancement mode has been selected, at 308, the routine includes determining if a quiet mode has been selected. If it is determined that a quiet mode has been selected, the routine may proceed to step 306 and the engine may be operated with each of the first valve, the second valve, the third valve, and the fourth valve of the sound enhancing system closed to reduce any engine noise reaching the vehicle cabin.

If it is determined that a sound enhancing mode has been selected and the mode is not the quiet mode, it is inferred that a race car mode, a performance mode, etc., has been selected. At 310, openings of one or more of the adjustable valves may be adjusted based on the selected mode. In one example, if a race car mode is selected, the second valve and the fourth valve may be actuated to their respective open positions to route sound from the compressor recirculation path and the exhaust passage to the vehicle compartment. The operator may select a volume of the desired sound and the opening of the valves may be adjusted based on the desired volume, the valve openings increased with an increase in the desired volume. As an example, if the desired volume of the race car sound is highest, each of the second valve and the fourth valve may be actuated to fully open positions. In another example, if a performance mode is selected, the first valve and the third valve may be actuated to their respective open positions to route sound from the intake passage and the charge air passage to the vehicle compartment. Also, the opening of each of the first valve and the third valve may be adjusted based on a volume of the sound as selected by the operator. Sound from the engine regions may be audible inside the vehicle cabin through a speaker coupled to the sound tube.

If one of the first valve, the second valve, and the third valve is open, a portion of the intake airflow may be routed to the sound enhancing system and not to the engine cylinders. At 312, the controller may estimate an amount of airflow routed from one or more of the low pressure intake passage, the compressor recirculation passage, and the high pressure intake passage to the sound tube. The airflow that is routed to the sound tube is not available at the engine cylinders for combustion. The amount of airflow may be directly proportional to a degree of opening of each of the first valve, the second valve, and the third valve. The controller may estimate an amount of airflow in the cylinders based on inputs from one or more of the manifold air flow sensor, the cylinder pressure sensor, and the exhaust oxygen sensor. In one example, a look-up table may be used to estimate the amount of airflow in the cylinders with inputs from one or more of the manifold air flow sensor, the cylinder pressure sensor, and the exhaust oxygen sensor as input and the amount of airflow entering the cylinders (for combustion) as output.

At 314, in order to compensate for the airflow not reaching the engine cylinders and being routed to the sound box, one or more engine actuators may be adjusted. As an example, the airflow compensation may be carried out based on a feedback control mechanism using a proportional integral derivative (PID) controller. In one example, based on the estimated amount of airflow entering the cylinders, a desired throttle opening may be estimated via the PID controller. By actuating the throttle opening to the desired amount, the airflow routed to the sound tube may be compensated and a desired engine air fuel ratio may be maintained. In one example, with an increase in the amount of airflow routed to the sound tube, the throttle opening may be increased. The controller may further adjust one or more of the exhaust gas recirculation (EGR) valve opening, the compressor recirculation valve opening, wastegate valve opening, and geometry of a variable geometry turbine (VGT) in order to compensate for the drop in cylinder airflow. As an example, in response to an increase in the amount of airflow routed to the sound tube, one or more of the EGR valve opening may be increased, the compressor recirculation valve opening may be decreased, the wastegate valve opening may be decreased, and the VGT vanes may be opened to allow increased boost.

In this way, during a first condition, one or more valves of a sound enhancing system may be opened to divert air from one or more engine regions to a sound tube and compensating for the diverted air and during a second condition, the one or more valves of the sound enhancing system closed may be maintained. In the first condition, a mode of operation of the sound enhancing system is selected by an operator via a human machine interface and in the second condition, the mode of operation of the sound enhancing system is not selected by the operator and the sound enhancing system is not operated.

FIG. 4 shows an example timeline 400 illustrating operation of a sound enhancement system. The horizontal (x-axis) denotes time and the vertical markers t1-t3 identify significant times in sound enhancement.

The first plot, line 402, denotes engine speed as estimated via a crankshaft sensor. The second plot, line 404, shows a sound mode selectable by the operator via an input to a human machine interface (HMI). A first mode (mode 1) may correspond to a quiet mode, a second mode (mode 2) may correspond to a performance mode, and a third mode (mode 3) may correspond to a race car mode. Upon selection of each mode, a combination of engine valves may be opened to transmit sound from one or more specific engine regions to the vehicle compartment. The third plot, line 404, shows a volume of the sound routed from one or more engine regions to the vehicle cabin as selected by the operator via the HMI. The fourth plot, line 406, shows an opening of a first valve (valve_1) fluidically coupling a lower pressure intake passage to a sound tube of the sound enhancement system. The fifth plot, line 408, shows an opening of a second valve (valve_2) fluidically coupling a compressor recirculation passage to the sound tube. The sixth plot, line 410, shows an opening of a third valve (valve_3) fluidically coupling the higher pressure intake passage to the sound tube. The seventh plot, line 412, shows an opening of a fourth valve (valve_4) fluidically coupling a turbine outlet to the sound tube.

Prior to time t1, the engine is not operational and the vehicle is not propelled using engine torque. Each of the valve_1, valve_2, valve_3, and valve_4 may be maintained in closed positions. At time t1, the engine is started from rest and the operator selects a performance mode and a sound volume level for the sound enhancement system. In order to provide the requested sound to the vehicle cabin according to the performance mode, valve_1, and valve_3 are opened to route sound from the lower pressure intake passage and the higher pressure intake passage to the vehicle cabin while valve_2 and valve_4 are maintained in their respective closed positions. The degree of opening of each of the valve_1 and valve_3 are adjusted proportional to the sound volume level selected by the operator. By opening valve_1 and valve_3, air from each of the lower pressure intake passage and the higher pressure intake passage is routed to the sound tube wherein the sound characteristics are modified to enhance the experience of the sound enhancement system before the sound is routed to the vehicle cabin. Valve_2 and valve_4 remain closed.

At time t2, in response to an increase in the sound volume level as requested by the operator, openings of each of the valve_1 and valve_3 are increased to increase the volume of the sound routed from the lower pressure intake passage and the higher pressure intake passage to the vehicle cabin. At time t3, a quiet mode is selected by the operator. In response to the selection of a quiet mode, each of the valve_1 and valve_3 are actuated to their respective closed positions while valve_2 and valve_4 are maintained in their closed positions. In the quiet mode, sound from any engine region is not routed to the vehicle cabin. The sound enhancement system is continued to be operated in the quiet mode until further mode change is indicated by the operator.

In this way, sound from one or more specific engine regions may be routed to the vehicle cabin based on operator preference. By including valves in a plurality of engine passages, air from the specific engine region may be routed to the sound enhancement system wherein the sound may be further enhanced to suit the operator's preference. The technical effect of adjusting throttle position and other engine actuators in response to opening of the sound enhancement system valves is that a reduction in charge air may be compensated and desired engine air fuel ratio may be maintained. Overall, by adjusting one or more valves of the sound enhancement system based on a selected mode, sound corresponding to a desired engine region may be routed to the vehicle cabin while engine performance is being maintained.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

In one embodiment, a method includes adjusting one or more valves fluidically coupling a region of an engine to a sound tube of a sound enhancing system to route engine sound to a vehicle cabin based on a mode selected by an operator, and selectively adjusting a throttle opening to compensate for air routed from the region to the sound tube. In a first example of the method, an opening of the one or more valves is adjusted based on a volume level of sound, as audible in the vehicle cabin, selected by the operator. A second example of the method optionally includes the first example, and further includes, wherein the region includes one or more of a lower pressure intake passage, a compressor recirculation passage, a higher pressure intake passage, and an outlet passage of a turbocharger turbine. A third example of the method optionally includes one or more of the first and second examples, and further includes, wherein compensation for air routed from the region to the sound tube is further carried out by adjusting one or more of an exhaust gas recirculation (EGR) valve opening, a compressor recirculation valve opening, and a geometry of the turbocharger turbine. A fourth example of the method optionally includes one or more of the first through third examples, and further includes, wherein the one or more valves including a first valve fluidically coupling the lower pressure intake passage to the sound tube, a second valve fluidically coupling the compressor recirculation passage to the sound tube, a third valve fluidically coupling the higher pressure intake passage to the sound tube, and a fourth valve fluidically coupling the outlet passage of the turbocharger turbine to the sound tube. A fifth example of the method optionally includes one or more of the first through fourth examples, and further includes, wherein the one or more of the first valve, the second valve, the third valve, and the fourth valve are simultaneously opened based on the mode selected and wherein the mode selected includes one of a quiet mode, a performance mode, and a race car mode. A sixth example of the method optionally includes one or more of the first through fifth examples, and further includes, wherein the quiet mode includes maintaining each of the first valve, the second valve, the third valve, and the fourth valve in their respective closed positions. A seventh example of the method optionally includes one or more of the first through sixth examples, and further includes, wherein the performance mode includes opening each of the first valve and the third valve while maintaining each of the second valve and the fourth valve in their respective closed positions, a degree of opening of each of the first valve and the third valve adjusted proportional to a volume level of sound selected by the operator. An eighth example of the method optionally includes one or more of the first through seventh examples, and further includes, wherein the race car mode includes opening each of the second valve and the fourth valve while maintaining each of the first valve and the third valve in their respective closed positions, a degree of opening of each of the second valve and the fourth valve adjusted proportional to a volume level of sound selected by the operator. A ninth example of the method optionally includes one or more of the first through eighth examples, and further includes, wherein selectively adjusting the throttle opening is based on a feedback control of an amount of charge air entering an engine cylinder and wherein the throttle opening is increased in response to an increase in opening of one or more of the first valve, the second valve, and the third valve. A tenth example of the method optionally includes one or more of the first through ninth examples, and further includes, wherein the sound tube includes one or more of a flexible membrane or diaphragm, a tuning cavity, and a foam interface to enhance the engine sound routed to the vehicle cabin. An eleventh example of the method optionally includes one or more of the first through tenth examples, and further includes, wherein the mode and the volume level of sound is selected via an input to one or more of a user interface located inside the vehicle cabin and a portable device operated by the operator.

In another embodiment, a system includes during a first condition, opening one or more valves of a sound enhancing system to divert air from one or more engine regions to a sound tube and compensating for the diverted air, and during a second condition, maintaining the one or more valves of the sound enhancing system closed. In a first example of the system, when in the first condition, a mode of operation of the sound enhancing system is selected by an operator via a human machine interface and wherein in the second condition, the mode of operation of the sound enhancing system is not selected by the operator and the sound enhancing system is not operated. A second example of the system optionally includes the first example, and further includes, wherein the one or more valves include a first valve coupled to a first branch extending between a lower pressure intake passage and the sound tube, a second valve coupled to a second branch extending between a compressor recirculation passage and the sound tube, a third valve coupled to a third branch extending between a higher pressure intake passage and the sound tube, and a fourth valve coupled to a fourth branch extending between an exhaust passage, downstream of an exhaust turbine, and the sound tube. A third example of the system optionally includes one or more of the first and second examples, and further includes, wherein opening of the one or more valves and a degree of opening of the one or more valves is based on the selected mode of operation, the mode of operation corresponding to sound transmitted to a vehicle cabin from the one or more engine regions via the sound tube. A fourth example of the system optionally includes one or more of the first through third examples, and further includes, wherein compensating for the diverted air includes adjusting one or more of an opening of an intake throttle, an opening of an exhaust gas recirculation (EGR) valve, an opening of a compressor recirculation valve, and a geometry of a variable geometry exhaust turbine, the adjusting based on an estimated amount of air diverted.

In yet another embodiment, a system includes, a controller with computer readable instructions stored on non-transitory memory that, when executed, cause the controller to, in response to selection of a mode of operation of a sound enhancing system by an operator, open one or more valves fluidically coupling one or more corresponding engine regions to the sound enhancing system to route air from the one or more corresponding engine regions to a vehicle cabin via a sound tube of the sound enhancing system, estimate an amount of air routed to the vehicle cabin, and adjust charge airflow based on the estimated amount of air routed to the vehicle cabin. In a first example of the system, the one or more corresponding engine regions include one or more of a lower pressure intake passage, a higher pressure intake passage, a compressor recirculation passage, and an outlet of an exhaust turbine. A second example of the system optionally includes the first example, and further includes, wherein adjusting charge airflow includes adjusting one or more of an opening of an intake throttle, an opening of an exhaust gas recirculation (EGR) valve, an opening of a compressor recirculation valve, and a geometry of a variable geometry exhaust turbine based on the estimated amount of air routed to the vehicle cabin and an engine air fuel ratio.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting one or more valves fluidically coupling a region of an engine to a sound tube of a sound enhancing system to route engine sound to a vehicle cabin based on a mode selected by an operator, and selectively adjusting a throttle opening to compensate for air routed from the region to the sound tube;
wherein the region includes one or more of a lower pressure intake passage, a compressor recirculation passage, a higher pressure intake passage, and an outlet passage of a turbocharger turbine, and
wherein compensation for air routed from the region to the sound tube is further carried out by adjusting one or more of an exhaust gas recirculation (EGR) valve opening, a compressor recirculation valve opening, and a geometry of the turbocharger turbine.

2. The method of claim 1, further comprising adjusting an opening of the one or more valves based on a volume level of sound, as audible in the vehicle cabin, selected by the operator.

3. The method of claim 2, wherein the one or more valves including a first valve fluidically coupling the lower pressure intake passage to the sound tube, a second valve fluidically coupling the compressor recirculation passage to the sound tube, a third valve fluidically coupling the higher pressure intake passage to the sound tube, and a fourth valve fluidically coupling the outlet passage of the turbocharger turbine to the sound tube.

4. The method of claim 3, wherein the one or more of the first valve, the second valve, the third valve, and the fourth valve are simultaneously opened based on the mode selected and wherein the mode selected includes one of a quiet mode, a performance mode, and a race car mode.

5. The method of claim 4, wherein the quiet mode includes maintaining each of the first valve, the second valve, the third valve, and the fourth valve in their respective closed positions.

6. The method of claim 4, wherein the performance mode includes opening each of the first valve and the third valve while maintaining each of the second valve and the fourth valve in their respective closed positions, a degree of opening of each of the first valve and the third valve adjusted proportional to the volume level of sound selected by the operator.

7. The method of claim 4, wherein the race car mode includes opening each of the second valve and the fourth valve while maintaining each of the first valve and the third valve in their respective closed positions, a degree of opening of each of the second valve and the fourth valve adjusted proportional to a volume level of sound selected by the operator.

8. The method of claim 4, wherein selectively adjusting the throttle opening is based on a feedback control of an amount of charge air entering an engine cylinder and wherein the throttle opening is increased in response to an increase in opening of one or more of the first valve, the second valve, and the third valve.

9. The method of claim 1, wherein the sound tube includes one or more of a flexible membrane or diaphragm, a tuning cavity, and a foam interface to enhance the engine sound routed to the vehicle cabin.

10. The method of claim 1, wherein the mode and a volume level of sound is selected via an input to one or more of an user interface located inside the vehicle cabin and a portable device operated by the operator.

11. A method of enhancing engine sounds, comprising:
during a first condition, opening one or more valves of a sound enhancing system to divert air from one or more engine regions to a sound tube and compensating for the diverted air; and
during a second condition, maintaining the one or more valves of the sound enhancing system closed,
wherein the one or more valves include a first valve coupled to a first branch extending between a lower pressure intake passage and the sound tube, a second valve coupled to a second branch extending between a compressor recirculation passage and the sound tube, a third valve coupled to a third branch extending between a higher pressure intake passage and the sound tube, and a fourth valve coupled to a fourth branch extending between an exhaust passage, downstream of an exhaust turbine, and the sound tube.

12. The method of enhancing engine sounds of claim 11, wherein in the first condition, a mode of operation of the sound enhancing system is selected by an operator via a human machine interface and wherein in the second condition, the mode of operation of the sound enhancing system is not selected by the operator and the sound enhancing system is not operated.

13. The method of enhancing engine sounds of claim 12, wherein opening of the one or more valves and a degree of opening of the one or more valves is based on the selected mode of operation, the mode of operation corresponding to sound transmitted to a vehicle cabin from the one or more engine regions via the sound tube.

14. The method of enhancing engine sounds of claim 11, wherein compensating for the diverted air includes adjusting one or more of an opening of an intake throttle, an opening of an exhaust gas recirculation (EGR) valve, an opening of a compressor recirculation valve, and a geometry of a variable geometry exhaust turbine, the adjusting based on an estimated amount of air diverted.

15. An engine system, comprising:
a controller with computer readable instructions stored on non-transitory memory that, when executed, cause the controller to:
in response to selection of a mode of operation of a sound enhancing system by an operator,
open one or more valves fluidically coupling one or more corresponding engine regions to the sound enhancing system to route air from the one or more corresponding engine regions to a vehicle cabin via a sound tube of the sound enhancing system;
estimate an amount of air routed to the vehicle cabin;
adjust charge airflow based on the estimated amount of air routed to the vehicle cabin; and
adjust an opening of the one or more valves based on a volume level of sound, as audible in the vehicle cabin, selected by the operator, wherein the one or more valves includes a first valve fluidically coupling a lower pressure intake passage to the sound tube, a second valve fluidically coupling a compressor recirculation passage to the sound tube, a third valve fluidically coupling a higher pressure intake passage to the sound tube, and a fourth valve fluidically coupling an outlet passage of a turbocharger turbine to the sound tube.

16. The engine system of claim 15, wherein the one or more corresponding engine regions include one or more of a lower pressure intake passage, a higher pressure intake passage, a compressor recirculation passage, and an outlet of an exhaust turbine.

17. The engine system of claim 15, wherein adjusting charge airflow includes adjusting one or more of an opening of an intake throttle, an opening of an exhaust gas recirculation (EGR) valve, an opening of a compressor recirculation valve, and a geometry of a variable geometry exhaust turbine based on the estimated amount of air routed to the vehicle cabin and an engine air fuel ratio.

* * * * *